US010571075B2

(12) United States Patent
Råholm et al.

(10) Patent No.: US 10,571,075 B2
(45) Date of Patent: Feb. 25, 2020

(54) LNG TANK AND SYSTEM FOR CONNECTING AT LEAST ONE PIPE BETWEEN AN LNG TANK AND A TANK CONNECTION SPACE THEREOF

(71) Applicant: WÄRTSILÄ FINLAND OY, Vaasa (FI)

(72) Inventors: Martin Råholm, Vaasa (FI); Viktor Bergman, Vaasa (FI); Ingvar Öst, Vaasa (FI); Mathias Jansson, Vaasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 0 days.

(21) Appl. No.: 15/537,260

(22) PCT Filed: Dec. 16, 2014

(86) PCT No.: PCT/FI2014/051011
§ 371 (c)(1),
(2) Date: Jun. 16, 2017

(87) PCT Pub. No.: WO2016/097460
PCT Pub. Date: Jun. 23, 2016

(65) Prior Publication Data

US 2017/0343159 A1 Nov. 30, 2017

(51) Int. Cl.
*F17C 1/12* (2006.01)
*F16L 59/12* (2006.01)
(Continued)

(52) U.S. Cl.
CPC .............. *F17C 1/12* (2013.01); *F16L 59/121* (2013.01); *F16L 59/141* (2013.01);
(Continued)

(58) Field of Classification Search
CPC ....... Y10T 137/7036; Y10T 137/86348; Y10T 137/86372; F16L 59/141; F16L 59/153;
(Continued)

(56) References Cited

U.S. PATENT DOCUMENTS 3,540,488 A * 11/1970 Voorhees ................ F16L 11/11 138/121
3,724,228 A * 4/1973 Sollami .................... F17C 1/12 220/560.13

(Continued)

FOREIGN PATENT DOCUMENTS

WO WO-2006/008299 A1 1/2006
WO WO-2012/032219 A1 3/2012

*Primary Examiner* — Atif H Chaudry
(74) *Attorney, Agent, or Firm* — Muncy, Geissler, Olds & Lowe, P.C.

(57) ABSTRACT

An LNG tank is a single-shell LNG tank having one shell and at least one pipe extending from the LNG tank to a tank connection space of the LNG tank. The shell of the LNG tank is substantially surrounded by insulation. The LNG tank has at least one bellow connection surrounding at least part of the length of the at least one pipe for connecting the at least one pipe extending from the LNG tank to the tank connection space. A system for connecting at least one pipe between an LNG tank and a tank connection space thereof is also provided. At least one pipe extends from the LNG tank to the tank connection space and which LNG tank is a single-shell tank having one shell. The at least one pipe is connected between the LNG tank and the tank connection space by at least one bellow connection.

8 Claims, 4 Drawing Sheets

13 14 10 11 15 20 16 16 16 16 16 16 24 L 17 18 19 18 19 LNG 17 18 15 25 23 17 12 22 22 21

(51) Int. Cl.
*F16L 59/14* (2006.01)
*F16L 59/153* (2006.01)
*F17C 1/00* (2006.01)
*F17C 13/00* (2006.01)

(52) U.S. Cl.
CPC ............ *F16L 59/153* (2013.01); *F17C 1/002* (2013.01); *F17C 13/001* (2013.01); *F17C 2203/0304* (2013.01); *F17C 2203/035* (2013.01); *F17C 2203/0333* (2013.01); *F17C 2203/0358* (2013.01); *F17C 2203/0391* (2013.01); *F17C 2203/0614* (2013.01); *F17C 2205/0355* (2013.01); *F17C 2221/033* (2013.01); *F17C 2265/066* (2013.01); *F17C 2270/0105* (2013.01); *Y10T 137/7036* (2015.04); *Y10T 137/86348* (2015.04); *Y10T 137/86372* (2015.04)

(58) Field of Classification Search
CPC ............ F16L 59/121; F17C 2223/0161; F17C 13/001; F17C 2203/0304; F17C 1/12; F17C 2203/0614; F17C 2203/0617; F17C 2270/0105
See application file for complete search history.

(56) References Cited

U.S. PATENT DOCUMENTS

| | | | | |
|---|---|---|---|---|
| 4,582,221 | A | 4/1986 | Lamb et al. | |
| 6,631,615 | B2 * | 10/2003 | Drube ..................... | F17C 5/007 62/50.4 |
| 2004/0206413 | A1 * | 10/2004 | Claussen ............... | F16L 59/143 138/149 |
| 2013/0187374 | A1 * | 7/2013 | Karlsson ................. | F17C 1/002 285/47 |
| 2015/0135734 | A1 * | 5/2015 | Carlander-Reuterfelt .................. | F17C 13/082 62/53.2 |

* cited by examiner

LNG TANK AND SYSTEM FOR CONNECTING AT LEAST ONE PIPE BETWEEN AN LNG TANK AND A TANK CONNECTION SPACE THEREOF

BACKGROUND OF THE INVENTION

Field of the Invention

The invention is in general related to the field of using liquid fuel, in particular liquefied natural gas (LNG), as a marine fuel in one or more engines of a ship or of a corresponding sea-going vessel. In particular the invention is related to LNG tanks and connecting pipes to an LNG tank. More particularly the invention relates to the LNG tank according to the preamble of the independent LNG tank claim and to the system for connecting at least one pipe between an LNG tank and a tank connection space thereof according to the preamble of independent system claim.

Brief Description of the Related Art

Liquid fuels that are used as marine fuels are typically liquefied natural gas, liquefied petroleum gas or liquid petroleum gas (LPG), methanol, ethylene. Natural gas is in gaseous form in room temperature. In ships that use natural gas as fuel, the natural gas is typically stored onboard in liquid form, and thus this marine fuel is commonly called by its acronym LNG (Liquefied Natural Gas). Natural gas can be kept in liquid form by maintaining its temperature below a boiling point, which is approximately −163° C. LNG system onboard comprises typically a bunkering station, which is the ship's connection with an LNG terminal on shore or with an LNG bunkering barge, insulated pipes for leading LNG to an LNG tank, which is for storage of LNG and a tank connection space i.e. a tank room where LNG is controllably evaporated and its distribution to the engine(s) is arranged. Typically LNG tank is a cylindrical, double-walled or single-walled, insulated stainless steel tank.

The double-shell tank typically has a stainless steel inner shell, which is designed for an internal pressure, and an outer shell that can act as a secondary barrier, and/or can be part of the isolation system containing vacuum, and possibly filled with perlite. The outer shell can be made of either stainless steel or carbon steel. The tank is insulated with perlite/vacuum.

The single-shell tank typically has a single-shell of either stainless steel or nickel steel with polyurethane insulation.

The LNG tank is usually the most expensive item in the LNG fuel handling system, taking up even 50-60% of the total cost of the system. For smaller tank sizes (below 300 $m^2$) double-walled structure is typically used, with a vacuum generated between the shells for heat insulation. In double shell tanks the inner wall is stainless steel and the outer wall can be either stainless steel or carbon steel. For bigger tank sizes stainless steel single-shell tanks with polyurethane (PUR) insulation on the outer surface of the shell have typically been used.

Vacuum insulated double-shell tanks are more expensive than single shelled tank but are used due to their good insulation properties, which are needed to achieve the required holding time on smaller tank sizes.

In single shell tanks that are typically used for bigger tank sizes it has been preferred to use a pump, instead of a pressure build up system as used in pressurized double-shell tanks. When using the pump, connections to piping can be taken from the top of the tank, and there is no need for a bottom connection. Furthermore, in ships single shell tanks are usually placed on deck due to their bigger size as on deck installations there is no space limitation on the top part of the tank and therefore all connections have been centralized through a dome at the top of the tank. On the other hand the dome limits use of single-shell tank inside a ship due to limitation of space in vertical direction.

The LNG storage tank and associated components such as valves and piping are typically located in a space designed to act as a second barrier in case of liquid or compressed gas leakage.

The natural gas is delivered to the engines as a gas but stored as a liquid. A tank connection space is associated with a storage tank and contains the equipment to convert the liquid into a gas for safe delivery to the engines. The tank connection space is also considered a 'secondary barrier' in case there should be leakage of the LNG, since liquid pipes are inside it.

The piping between the LNG tank and the tank connection space is double-walled and conventionally pipes are arranged to go through the outer shell of the LNG tank and pass into the space between the inner and outer shells of the LNG tank before they are connected to the inner shell, preferably by welding. This conventional arrangement is functional as such but it requires that the outer shell of the LNG tank is made of stainless steel since all connections to the inner shell should be inside a stainless steel cover.

In patent application publication WO 2012/032219 is disclosed an arrangement for connecting a double-walled pipe of stainless steel to an LNG tank having an inner shell of stainless steel and an outer shell spaced apart from the inner shell, the said inner and outer shells defining an insulation space there between wherein the at least one double-walled pipe comprises a common outer wall and at least one inner pipe, wherein the outer wall of the pipe is connected to the inner shell of the tank by a pipe fitting in such a way that the pipe fitting of cold resistant material between the said inner shell and the outer wall is arranged to compensate for changes in the length of the outer wall of the pipe and/or of the pipe fitting due to temperature differences between the outer wall of the pipe and the inner shell of the tank, the pipe fitting being formed as a bellows-like structure. The bellows is preferably connected by welding to the outer wall of the pipe and to the inner shell of the tank. In this known arrangement an LNG tank with more LNG space within a certain space is achieved as the annular space of the vacuum insulated tanks has been reduced by centralizing pipe connections, comprising at least one pipe, through one bellow and thus removing them from the annular space. By reducing the annular space either the inner shell diameter can be increased or the outer shell diameter can be reduced. By increasing the inner shell diameter more LNG can be fitted within the same space. By reducing the outer shell diameter less space is needed to fit a certain LNG volume.

In US patent publication 4582221 is disclosed a LNG tank, which LNG tank is a single-shell LNG tank having one shell and which LNG tank comprises at least one pipe extending from the LNG tank to a tank connection space (20) of the LNG tank, wherein the shell of the LNG tank is surrounded by insulation and the LNG tank comprises at least one bellow connection surrounding at least part of the length of the at least one pipe for connecting the at least one pipe extending from the LNG tank to the tank connection space.

Natural gas is a safe fuel when the right precautions are taken. Neither is LNG in a liquid state explosive, corrosive or toxic. Thus, possible spillages will not cause any lasting contamination, as the liquid will evaporate as gas. The low temperature, however, is an issue when considering normal ship steels as too low temperatures may cause defects such as cracks to the steel.

SUMMARY OF THE INVENTION

An object of the present invention is to provide an improved LNG tank and system for connecting at least one pipe of a single-shell LNG tank, in which the problems described above are eliminated or at least minimized.

An object of the present invention is to provide an improved LNG tank and system for connecting at least one pipe of a single-shell LNG tank, which is cost-effective and easy to install.

Another object of the invention is to prevent any leakage and cold temperatures related problems in a single-shell LNG tank.

Another object of the invention is to create a single-shell LNG tank with more LNG volume within a certain space.

In order to achieve the above objects and those that will come apparent later the LNG tank according to the invention is characterized by the features of independent LNG tank claim and the system for connecting at least one pipe between an LNG tank and a tank connection space thereof according to the invention is characterized by the features of the characterizing part of independent system claim. Advantageous embodiments and features are defined in dependent claims.

According to the invention the LNG tank is a single-shell LNG tank having one shell and comprising at least one pipe extending from the LNG tank to a tank connection space of the LNG tank, wherein the shell of the LNG tank is substantially surrounded by insulation and the LNG tank comprises at least one bellow connection surrounding at least part of the length of the at least one pipe for connecting the at least one pipe extending from the LNG tank to the tank connection space.

According to an advantageous feature a tank connection space is arranged adjacent to the LNG tank.

According to an advantageous feature the bellow connection connecting the LNG tank and the tank connection space forms a structure surrounding the at least one pipe, which structure is flexible for compensating changes in the distance between the tank wall and the wall of the tank connection space caused by temperature differences.

According to an advantageous feature the bellow connection comprises insulation substantially surrounding the at least one pipe.

According to the invention the bellow connection comprises insulation arranged outside the bellow connection. According to an advantageous feature the bellow connection comprises insulation arranged inside the bellow connection.

According to an advantageous feature the bellow connection comprises insulation surrounding substantially the bellow connection from outside.

According to an advantageous feature the LNG tank comprises at least one pipe extending from above the LNG level of the LNG tank and an upper bellow connection for connecting the at least one pipe and at least one other pipe extending from below the LNG level of the LNG tank and another lower bellow connection for connecting the at least one other pipe.

According to an advantageous feature the bellow connection extends along at least part of the distance between the LNG tank and the tank connection space.

According to the invention the insulation extends along at least part of the distance between the LNG tank and the tank connection space, which insulation is arranged outside the bellow connection.

According to an advantageous feature the bellow connection extends into the tank connection space.

According to an advantageous feature the insulation extends into the tank connection space, which insulation is arranged inside the bellow connection.

According to an advantageous feature the insulation of the LNG tank is polyurethane or vacuum insulated panels.

According to an advantageous feature the insulation of the bellow connection is mineral wool, polyurethane or vacuum insulated panels.

According to the invention the system for connecting at least one pipe between an LNG tank and a tank connection space thereof, which at least one pipe extends from the LNG tank to the tank connection space and which LNG tank is a single-shell tank having one shell, wherein the at least one pipe is connected between the LNG tank and the tank connection space by at least one bellow connection.

According to an advantageous feature the bellow connection comprises insulation substantially surrounding the at least one pipe and the bellow connection forms a structure surrounding the at least one pipe, which structure is flexible for compensating changes in length of the at least one pipe caused by temperature differences.

According to an advantageous feature the system comprises at least one pipe extending from above the LNG level of the LNG tank and an upper bellow connection for connecting the at least one pipe and at least one other pipe extending from below the LNG level of the LNG tank and another lower bellow connection for connecting the at least one other pipe.

According to an advantageous feature the bellow connection extends along at least part of the distance between the LNG tank and the tank connection space.

Below deck installations require a tank connection space, which is according to an advantageous aspect of the invention connected to the single-shell LNG tank with bellows and the bellows of the bellow connection will compensate for the LNG tank's movement caused by temperature variations.

According to one advantageous aspect of the invention two bellow connections are located at the dished end of the LNG tank. The bellows of the bellow connections compensate for the movement caused by thermal contractions.

According to an advantageous feature one of the bellows is for connections located below the liquid level of the LNG tank and the other of the bellows is for connections located in the gaseous part of the LNG tank i.e. above the liquid level of the LNG tank.

According to an advantageous feature pipes containing LNG and connected below the liquid level of the LNG tank have a secondary barrier i.e. they are double walled pipes. The double walled pipes limit the space where the content of the LNG from the tank can leak, in case of the pipe containing LNG leaking, since the double wall is closed at the ending of the pipe inside the tank connection space. This way the whole content of the LNG tank cannot be leaked inside the tank connection space.

According to an advantageous aspect of the invention by using a bellows, the bellows absorbs relative movement between the tank wall and the tank connection space wall caused by differences in temperature. The temperature of the LNG tank shell can vary considerably, from room temperature of an empty tank, to the temperature of cold LNG when the tank is filled. The materials utilized for the bellows are advantageously stainless steels, preferably austenitic type steels.

The bellow connection will transport coldness to the tank connection space and to prevent the tank connections space from becoming too cold trace heating can be used, for example by installing heat coils between the bellow pipe and the bellow pipe insulation. As another possibility for preventing coldness from reaching the tank connection space, the bellows pipe can include a flange connection, wherein between the flanges glass-reinforced plastic (GRP) or similar thermal insulating part is installed.

According to an advantageous aspect a ship comprises the system for connecting at least one pipe between an LNG tank and a tank connection space thereof according to the invention.

The system and the LNG tank according to the invention and its advantageous features and aspects enables a direct connection of the pipes from the LNG tank into the tank connection space i.e. into the tank connection space, when the tank connection space is arranged adjacent to the tank. So the advantage is that the connection between adjacent tank shell and tank connection space wall can be made with a double walled structure that is flexible absorbing longitudinal and sideways transitions caused by heat expansion/reduction. Also, by using a single-shell an LNG tank can achieve more liquid space achieved than by using same size double-shell LNG tank. Naturally also the LNG tank is possible to be designed smaller in case further liquid space is not needed. The bellow connection construction according to the invention also makes it possible to locate the LNG tank and the tank connection space close or even next to each other and thus space is saved. It should be remembered that on ships the space available is very limited, especially inside the ship.

BRIEF DESCRIPTION OF THE DRAWINGS

In the following the invention is described in more detail by reference to the accompanying drawing in which.

DETAILED DESCRIPTION OF THE PREFERRED EMBODIMENTS

Figure 1:
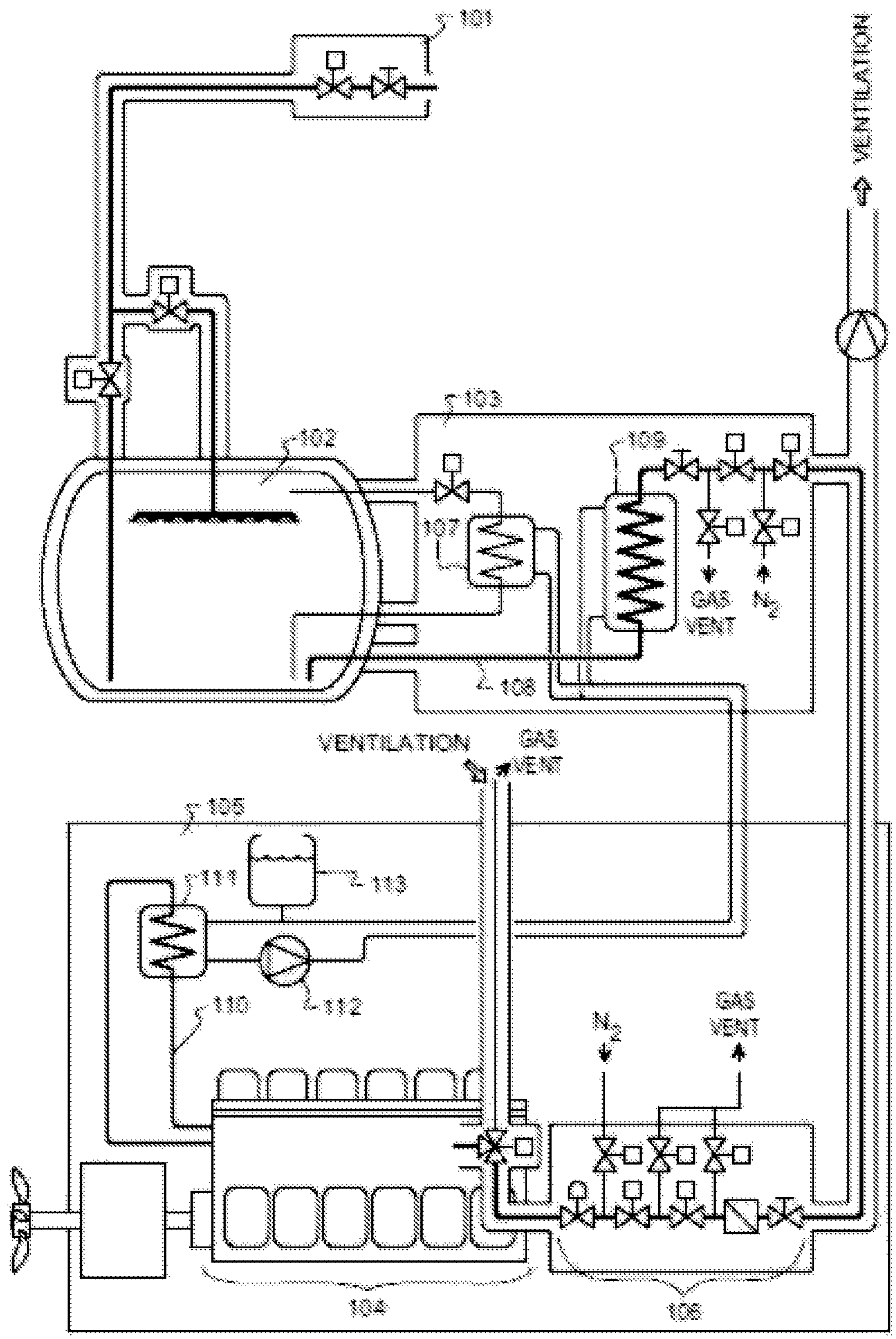
FIG. 1 shows schematically a prior art LNG fuel distribution architecture.

FIG. 1 illustrates schematically the architecture of a known system onboard an LNG-fueled ship. An LNG bunkering station 101 is located on the deck and used to fill up the system with LNG. The LNG fuel storage system comprises one or more thermally insulated gas tanks 102 for storing the LNG in liquid form, and the so-called tank connection space 103 where the LNG is controllably evaporated and its distribution to the engine(s) is arranged. Evaporation means a phase change from liquid to gaseous phase, for which reason all subsequent stages should leave the L for liquefied out of the acronym and use only NG (Natural Gas) instead.

The engine 104 or engines of the ship are located in an engine room 105. Each engine has its respective engine-specific fuel input subsystem 106, which in the case of gaseous fuel is in some sources referred to as the GVU (Gas Valve Unit). The tank connection space 103 of FIG. 1 comprises two evaporators, of which the first evaporator 107 is the so-called PBU (Pressure Build-Up) evaporator used to maintain a sufficient pressure inside the gas tank 102. Hydrostatic pressure at the inlet of a main supply line 108 inside the gas tank 102 is the driving force that makes the LNG flow into the second evaporator 109, which is the MGE or Main Gas Evaporator from which the fuel is distributed in gaseous form towards the engines. In order to ensure that evaporated gas flows to the GVU(s) and further to the engine(s) at sufficiently high pressure, the PBU system maintains the internal pressure of the gas tank 102 at or close to a predetermined value, which is typically between 5 and 10 bars.

The engine 104 comprises one or more cooling circuits. Schematically shown in FIG. 1 is an external loop 110 of the so-called low temperature (LT) cooling circuit, which may be used for example to cool lubricating oil. The so-called LT water that circulates in the external loop 110 may have a temperature around 50 degrees centigrade when it goes through a heat exchanger 111, in which it donates heat to a mixture of glycol and water that in turn transfers heat to the evaporators 107 and 109. The glycol/water mixture circuit comprises a circulation pump 112 and an expansion tank 113. Glycol is needed in the mixture to prevent it from freezing when it comes into contact with the extremely cold LNG inlet parts of the evaporators 107 and 109.

Figure 2:
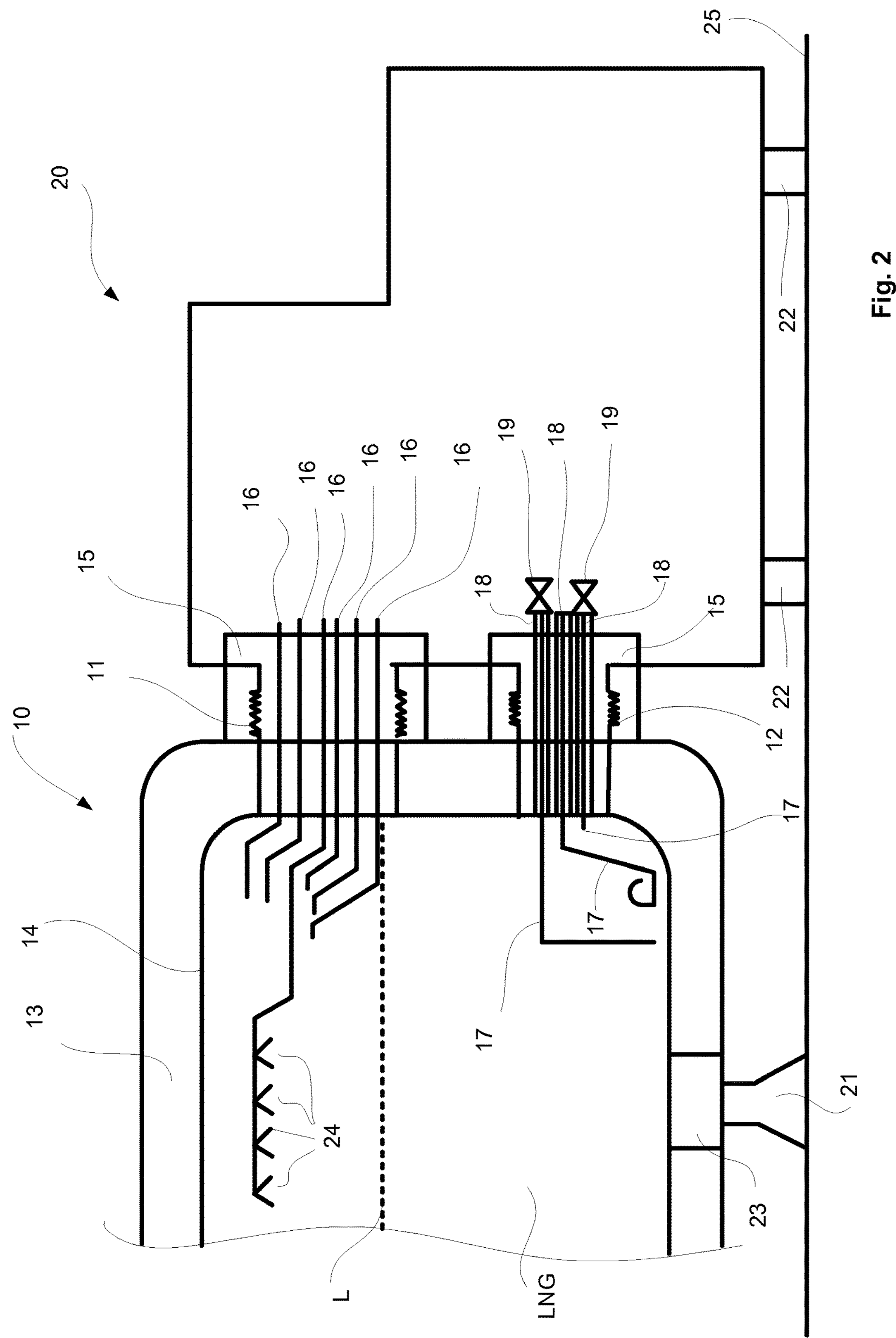
FIG. 2 shows schematically an advantageous example of the invention.
Figure 3:
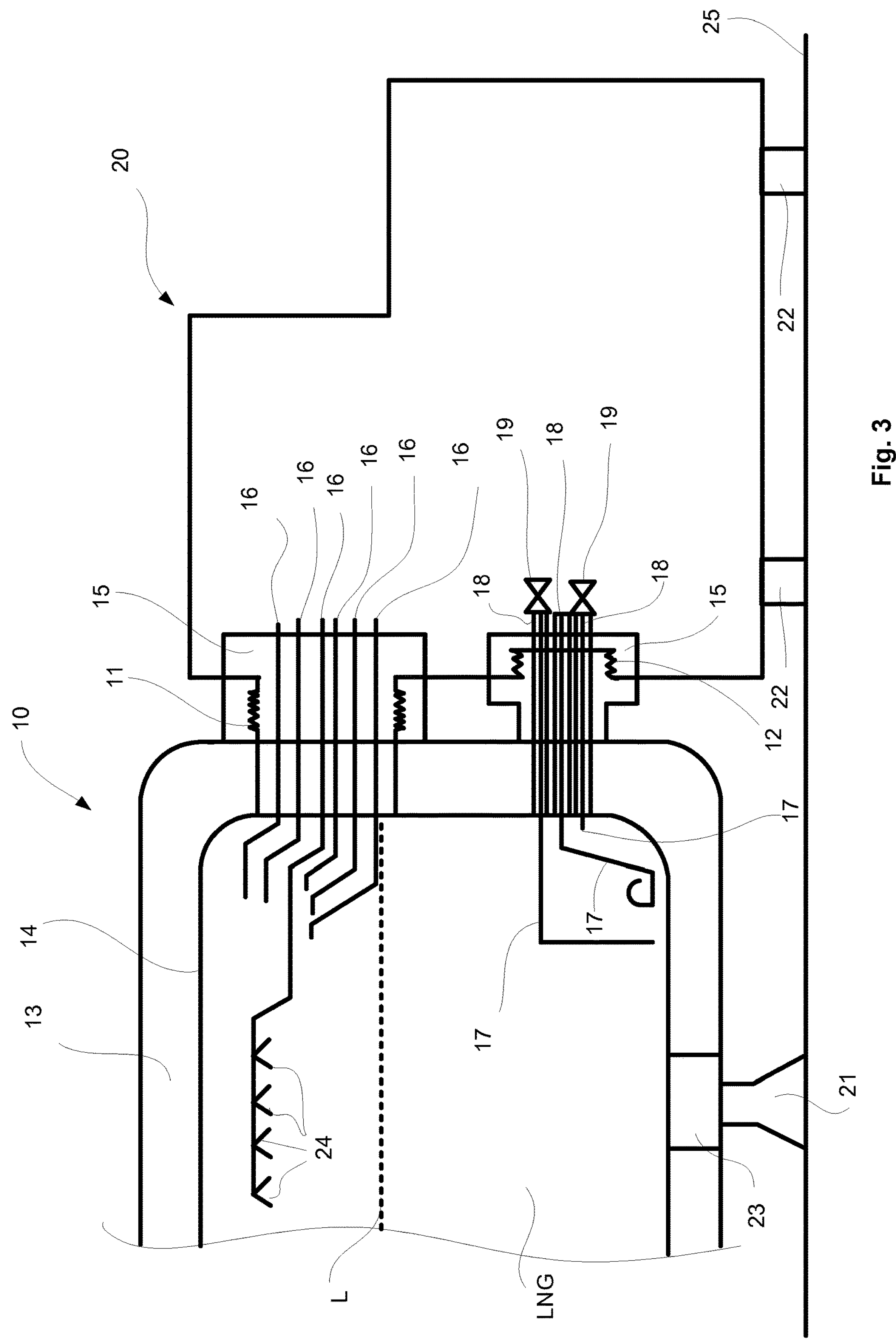
FIG. 3 shows schematically another advantageous example of the invention and FIG. 4 shows schematically yet another advantageous example of the invention.
Figure 4:
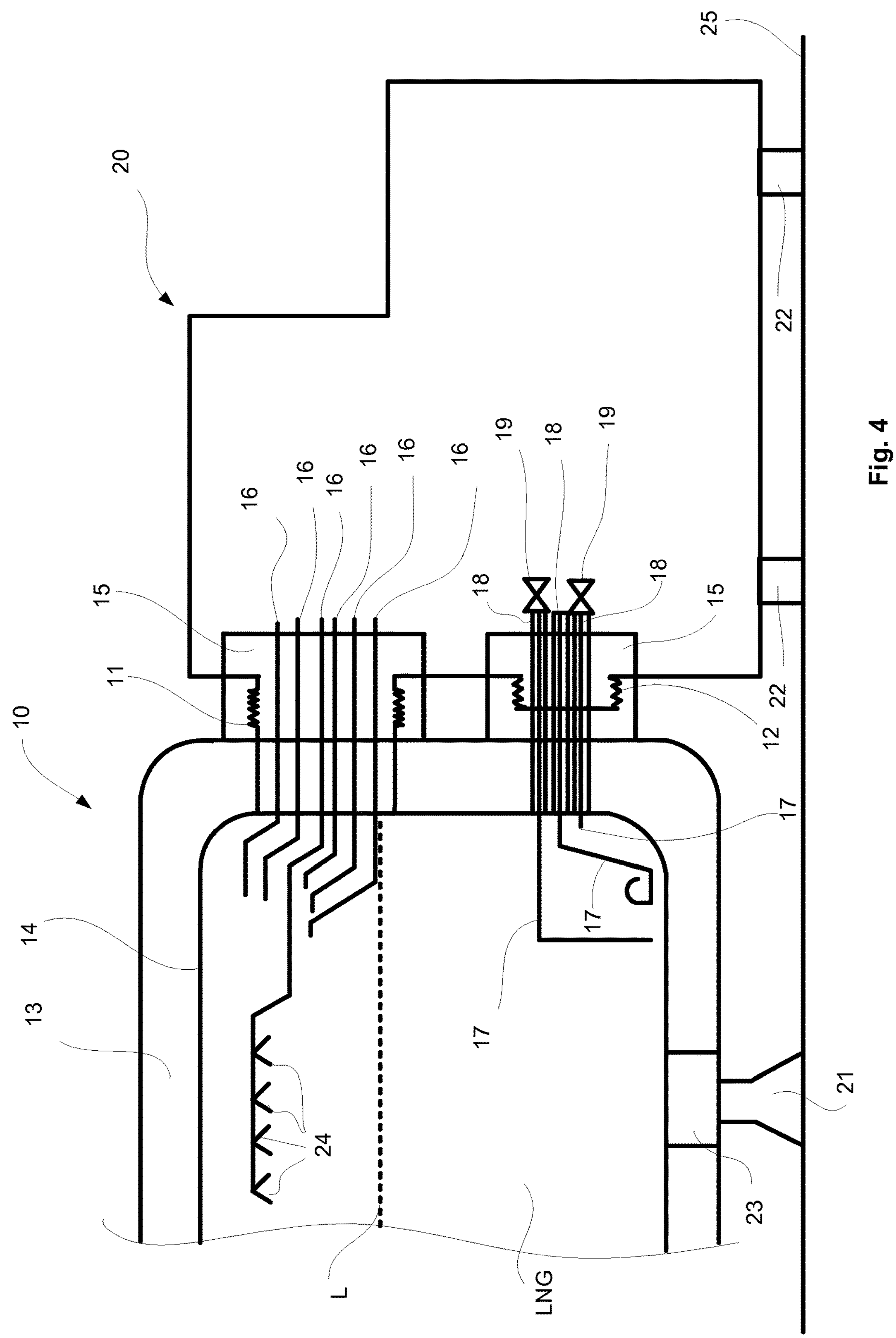

During the course of the following description of FIGS. 2-4 corresponding reference numbers and signs will be used to identify like elements, parts and part components unless otherwise mentioned. In the figures some reference signs have not been repeated for clarity reasons. In the following the examples are described mainly by reference to an LNG tank of a ship or a corresponding ship in view of simplifying the disclosure but it should be noted that instead of this example any type of a tank for LNG can have similar features and properties in accordance with the invention.

In the examples of FIGS. 2-4 a schematic vertical cross-section of a part of an LNG tank 10 and a tank connection space 20 associated therewith are shown. The LNG tank 10 is a single-shell LNG tank and comprises a shell 14 defining the tank space for the LNG. In the figure the level of the LNG is denoted by reference sign L. The shell 14 is surrounded by insulation 13, which is advantageously VIP (vacuum insulated panels) or PUR (polyurethane). The tank connection space 20 containing the equipment (not shown) for converting the liquid into a gas for safe delivery to the engines, is associated with the LNG tank 10, the equipment being in fluid connection with the LNG tank 10 via pipes 16 and LNG pipes 17, which pipes 16, 17 have one end in the LNG tank 10 and the other end in the tank connection space 20. The pipes 16 are located above the LNG level L of the LNG tank and are for example pipes for safety release valve, level measurement, top spray, sprays denoted by reference sing 24 and try cocks. Try cock is used as an overfill protection. If the LNG level during bunkering reaches the try cock the pipe will be filled with cold LNG and this will trigger an alarm and the bunkering procedure will shut down. The LNG pipes 17 located below the LNG level L are double walled and thus each LNG pipe 17 has an outer pipe 18. These pipes 17 comprise f. ex. bunkering line, fuel line to the engine, level or pressure measurement line, PBE inlet line. The LNG tank 10 and the tank connection space 20 have advantageously wooden legs 21, 22 that support the LNG tank 10 and the tank connection space on the deck 25 or corresponding support structure of the ship. The legs 21 of the LNG tank 10 have a support structure 23 in the tank insulation 13 area.

In the schematic FIGS. 2-4 are also shown bellow connections 11, 12 for the pipes 16 and LNG pipes 17. The bellow connections 11, 12 are formed as pipe-constructions surrounding the pipes 16, 17, correspondingly, and the pipe construction comprising bellow-structure for compensating the changes of the lengths due to the temperature differences. This enables the LNG tank 10 and the tank connection space 20 to be located adjacent each other, the LNG tank 10 being connected to the tank connection space 20 by the bellow connections 11, 12, which forms a structure surrounding the pipes 16,17 that is flexible for compensating changes in length caused by temperature differences. The bellow connections are made of cold resistant materials, preferably of stainless steel. The bellow connection 11, 12 acts as a secondary barrier in case of leakage of the LNG. The pipes 16, 17 are surrounded by insulation 15 located also around the bellow connection 11, 12, which insulation 15 is for example mineral wool, VIP (vacuum insulated panels) or PUR (polyurethane). The pipes 16, 17 may have further structures inside the tank connection space 20 for compensating changes in their length due to temperature differences.

In the schematic example of FIG. 2 the upper pipes 16 i.e. the pipes 16 extending into the LNG tank 10 above the LNG level L are surrounded by the upper bellow connection 11 formed of a pipe-construction having bellow-structure as part of the wall of the pipe construction. Also the lower LNG pipes 17 formed to double-walled pipes by the outer pipe 18 and extending to the LNG tank 10 below the LNG level L are surrounded by the lower bellow connection 12 formed of a pipe-construction having bellow-structure as part of the wall of the pipe construction. The bellow connections 11, 12 extend from the wall 14 of the LNG tank 10 into wall of the tank connection space 20. In the area of the tank insulation 13 the insulation 15 for the bellow connections 11, 12 is located inside the pipe-construction of the bellow connection 11, 12 and in the area between outer side of the tank insulation 13 and into the tank connection the insulation is located inside and also around the outside of the bellow construction 11, 12. The bellow structure of the bellow connections 11, 12 extend at least part of the distance between the LNG tank 10 and the tank connection space 20.

The schematic example of FIG. 3 corresponds substantially to the example of FIG. 2, the differences being that the lower bellow connection 12 has bellow-structure surrounding the pipes inside the tank connection space 20. From the other end the bellows structure 12 is connected to the tank connection space wall, and from the other end it is connected to a flange which the pipes 17 penetrate. The lower bellow 12 can be made this way since the pipes 17 are double walled and thereby have a secondary barrier for leakage of the LNG already. The bellow the connection between the pipes and the tank connection space wall compensates possible movement of the pipes, due to the pipes being attached to the LNG tank wall, and changes of length of the pipes 17, due to temperature differences. This embodiment cannot be made if the pipes 17 are not double walled.

The schematic example of FIG. 4 corresponds substantially to the example of FIG. 3, the differences being that that the lower bellow connection 12 has only bellow-structure surrounding the pipes just outside the tank connection space 20. The bellow in this example is extending outwards from the tank connection space wall.

Above only some advantageous examples of the invention have been described to which the invention is not to be narrowly limited. It is clear to one skilled in the art that many modifications and variations are possible within the invention as defined in the following claims.

REFERENCE SIGNS USED IN FIGS. 2-4

10 LNG tank
11 bellow connection
12 bellow connection
13 insulation
14 shell
15 insulation of bellows connection
16 pipes from above the LNG level
17 LNG pipes
18 outer pipe for LNG pipes
19 valve
20 tank connection space
21 foot of LNG tank
22 foot of tank connection space
23 foot attachment
24 spay
25 deck
L level of LNG
LNG liquefied natural gas

REFERENCE SIGNS USED IN FIG. 1

101 LNG bunkering station
102 tank
103 tank connection space
104 engine
105 engine room
106 fuel input subsystem
107 first evaporator
108 main supply line
109 second evaporator
110 external loop of the so-called low temperature (LT) cooling circuit
111 heat exchanger
112 circulation pump
113 expansion tank

The invention claimed is:

1. A single-shell LNG tank having one shell and comprising:

a tank connection space of the LNG tank;

a plurality of first pipes, disposed above a LNG level of the LNG tank, extending from the LNG tank to the tank connection space;

insulation surrounding the shell;

a plurality of LNG pipes, disposed below the LNG level of the LNG tank extending from the LNG tank to the tank connection space;

a first bellow connection forming a first pipe structure surrounding the plurality of first pipes for connecting the plurality of first pipes extending from the LNG tank to the tank connection space, a second bellow connection forming a second pipe structure surrounding the plurality of LNG pipes for connecting the plurality of LNG pipes extending from the LNG tank to the tank connection space, wherein the first bellow connection and the second bellow connection each comprises insulation arranged outside the bellow connection and the insulation arranged outside the bellow connection extends along at least part of a distance between the LNG tank and the tank connection space, wherein the first pipe structure and the second pipe structure are flexible for compensating changes in distance between a wall of the LNG tank and an adjacent wall of the tank connection space caused by temperature differences, and wherein the insulation of each of the first and second bellow connections is mineral wool, polyurethane or vacuum insulated panels.

2. The LNG tank according to claim 1, wherein the tank connection space is arranged adjacent to the LNG tank.

3. The LNG tank according to claim 2, wherein the first bellow connection and the second below connection extend along at least part of a distance between the LNG tank and the tank connection space.

4. The LNG tank according to claim 2, wherein the first bellow connection and the second below connection extend into the tank connection space.

5. The LNG tank according to claim 1, wherein insulation of the first bellow connection surrounds the plurality of first pipes.

6. The LNG tank according to claim 1, wherein each of the first and second bellow connections further comprises insulation arranged inside the respective bellow connection.

7. The LNG tank according to claim 6, wherein the insulation of the first bellow connection and the second below connection extends into the tank connection space, which insulation is arranged inside the first below connection and the second bellow connection.

8. A ship comprising a tank according to claim 1.

* * * * *